United States Patent [19]
Morikawa

[11] Patent Number: 5,443,547
[45] Date of Patent: Aug. 22, 1995

[54] EXHAUST GAS RECIRCULATION SYSTEM

[75] Inventor: Koji Morikawa, Muashino, Japan

[73] Assignee: Fuji Jukogyo Kabushiki Kaisha, Tokyo, Japan

[21] Appl. No.: 102,225

[22] Filed: Aug. 5, 1993

[30] Foreign Application Priority Data

Aug. 28, 1992 [JP] Japan ............................ 4-060733 U

[51] Int. Cl.6 ............................................. F02M 25/06
[52] U.S. Cl. ........................................ 60/274; 60/278; 123/571
[58] Field of Search .................. 60/274, 278; 123/571, 123/568

[56] References Cited

U.S. PATENT DOCUMENTS

| 4,130,098 | 12/1978 | Linder | 123/571 |
|---|---|---|---|
| 4,294,220 | 10/1981 | Yasuhara | 60/278 |
| 4,594,667 | 6/1986 | Yasuhara | 123/571 |
| 4,762,107 | 8/1988 | Schoneck | 123/571 |
| 4,762,109 | 8/1988 | Jeenicke | 123/571 |
| 4,924,840 | 5/1990 | Wade | 123/571 |

Primary Examiner—Douglas Hart
Attorney, Agent, or Firm—Beveridge, DeGrandi, Weilacher & Young

[57] ABSTRACT

An EGR system comprising a take-out port of the exhaust gas located downstream of the catalytic converter and upstream of the muffler, and an EGR control valve provided at the confluent portion of the intake air and the recirculated exhaust gas. The EGR control valve controls the amount of the recirculated exhaust gas by means of a slide valve therein which varies the opening area according to the electric current from the engine electronic control unit.

12 Claims, 3 Drawing Sheets

EXHAUST GAS RECIRCULATION SYSTEM

BACKGROUND OF THE INVENTION

The present invention relates to a method and an apparatus for recirculating exhaust gas and more specifically to a method and an apparatus for an engine needing a relatively high recirculation rate of exhaust gas.

As is well known, there are so many engines being equipped with an exhaust gas recirculation (hereafter referred to as "EGR") system in recent years. The EGR system is one of exhaust emission control systems by which NOx emission is reduced through recirculating a part of exhaust gas into an induction system and reducing the combustion temperature.

Commonly in the conventional EGR system, a take-out port of exhaust gas is disposed in the vicinity of an exhaust port of an engine and the exhaust gas is returned to an induction system of an engine through a control valve.

On the other hand, as disclosed in Japanese patent application laid open No. 1988-78256, it is proposed that in an EGR system in which a plurality of exhaust manifolds are provided and a catalytic converter is disposed corresponding to each exhaust manifold, a take-out port of exhaust gas is located at the downstream portion of the catalytic converter.

In a conventional engine where an air-fuel ratio control is carried out near the theoretical air-fuel ratio, an EGR rate (a rate of exhaust gas against induction air) has an upper limit near at most 20% because of a problem of combustion stability, although generally it is not necessary to recirculate so much amount of exhaust gas.

However, in a two cycle engine, especially a two cycle engine having a high pressure direct injection system (injecting fuel into a cylinder with high pressure) or a four cycle lean burn engine, a present 3-way catalyst which reduces CO, HC and NOx simultaneously at the theoretical air-fuel ratio is not effective. Therefore, an EGR is inevitably necessary to reduce NOx emission. In this case a very high EGR rate, for example, 40% to 50% of the EGR rate is needed. Namely, a large amount of recirculation gas is needed to reduce NOx emission.

Also, the lower the temperature of the recirculated exhaust gas is, the more the combustion temperature goes down, thereby the formation of NOx being suppressed.

Furthermore, since a two cycle engine with a high pressure direct injection system or a four cycle lean burn engine have a relatively high oxygen concentration in the exhaust gas, it is necessary to let flow exhaust gas more than several times as much as in case of a conventional engine, consequently the conventional EGR system comes substantially short of a flow capability in the recirculated exhaust gas.

SUMMARY OF THE INVENTION

In view of the foregoing, it is an object of the invention to provide an EGR system which can introduce a large quantity of recirculation gas into an engine needing a large amount of EGR gas, whereby being able to reduce NOx emission therefrom substantially.

It is another object of the invention to provide an EGR system which can reduce NOx emission more efficiently by introducing a large amount of low temperature recirculation gas into the induction system.

According to the present invention, there is provided an EGR system of an internal combustion engine such as a two cycle direct fuel injection engine and a four cycle lean burn engine in which a 3-way catalyst system is ineffective for reducing NOx emission.

One feature of the system characterized in the method of: providing a take-out port of the recirculation gas at downstream of a catalytic converter and upstream of a muffler so as to supply a low temperature exhaust gas.

Another feature of the system characterized in the apparatus of recirculation gas control valve located at a confluence portion of the induction air and the recirculation gas for controlling the amount of recirculation gas in proportion to the opening area of the recirculation gas control valve.

DETAILED DESCRIPTION OF PREFERRED EMBODIMENTS

Figure 1:
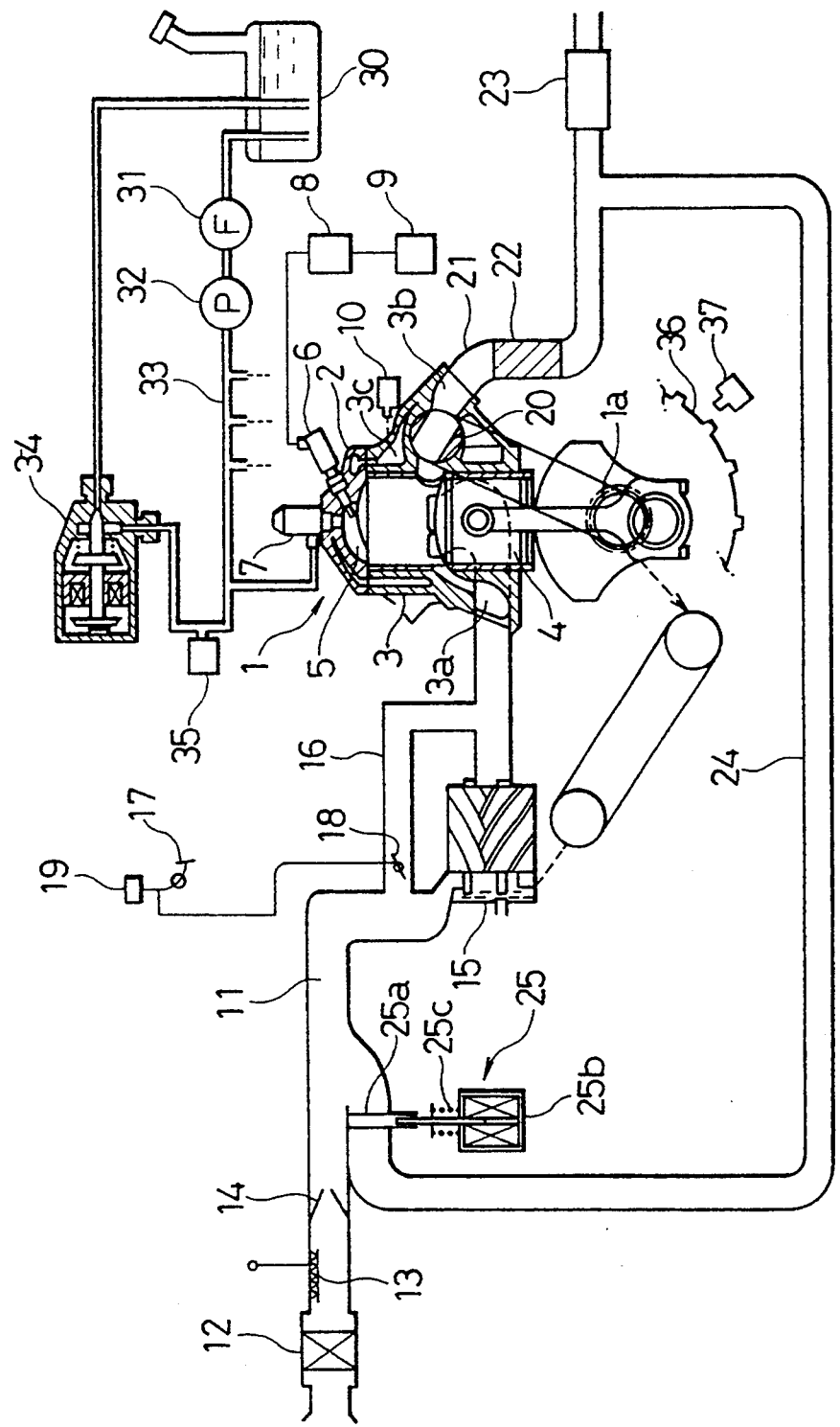
FIG. 1 is a schematic diagram showing the engine control system.

Referring to FIG. 1, reference numeral 1 denotes an engine. In this reference, the engine illustrates a two cycle four cylinders engine. A cylinder head 2, a cylinder block 3 and a piston 4 form a combustion chamber 5 wherein a spark plug 6 and a fuel injector 7 are disposed. The spark plug 6 is connected to the secondary side of an ignition coil 8 and an igniter 9 is connected with the primary side of the ignition coil 8.

Further, a scavenging port 3a and an exhaust port 3b are provided in the cylinder block 3 and in a coolant passageway 3c of the cylinder block 3 a coolant temperature sensor 10 is disposed. Also, delivery pipe 11 (corresponding to an air intake pipe of a four cycle engine) is connected to the above scavenging port 3a. Along the air delivery pipe 11 there are provided an air cleaner 12, an air flow sensor (in this reference an air flow sensor of a hot wire type) 13, a check valve 14 and a scavenging pump 15 which is driven by a crank shaft 1a in the order from upstream to downstream. The scavenging pump 15 acts as supercharging an induction air and scavenging the combustion chamber forcedly.

In a by-pass passage 16 by-passing the above scavenging pump 15 a by-pass control valve 18 operatively linked with an accelerator pedal is provided. An accelerator pedal opening sensor 19 is coupled with the accelerator pedal. In the abovementioned exhaust port 3b, an exhaust rotary valve 20 which is mechanically interlocked with the crankshaft 1a is disposed. An exhaust pipe 21 is coupled with the exhaust port 3b through this rotary valve 20. In the exhaust pipe 21, a catalytic converter 22 for processing CO and HC and a muffler 23 are installed. An EGR passageway 24 is extended from a portion between the catalytic converter 22 and the muffler 23. In this reference the catalytic converter is composed of a metal type catalyst.

The EGR passageway 24 is lead to an EGR control valve 25 installed at the downstream portion of the check valve 14 in the air delivery pipe 11. The EGR control valve 25 serves for preventing a back-flow of the exhaust gas together with the delivery air. The abovementioned EGR passageway 24 has an enough conduit area to secure a sufficient gas flow.

The EGR control valve 25 is composed of a plate-shaped slide valve 25a and a proportional solenoid 25b for varying the opening of the slide valve 25a. The slide valve 25a is always forced to be on the closing side by the force of a spring 25c. The above proportional solenoid 25b is driven by the electric current from an ECU 40 which will be described hereafter. The position of the slide valve 25a varies according to the electric current.

On the other hand, a numeral 30 denotes a fuel tank from which a fuel filter 31, a fuel pump 32 and a fuel supply conduit 33 are disposed in this order and the fuel supply conduit 33 is connected to a fuel injector 7 of each cylinder. The fuel supply pressure is regulated by a fuel pressure regulator 34 being connected with the fuel supply conduit 33. At the inlet side of the above fuel pressure regulator 34, a fuel pressure sensor 35 is arranged. When a fuel pressure signal detected by the fuel pressure sensor 35 is input to the ECU 40, a drive current output from this ECU 40 to the above fuel pressure regulator is feedback-controlled and thus a return fuel is controlled by the change of the valve opening of the fuel pressure regulator 34. As a result, the fuel pressure is controlled at a desired value.

Furthermore, a crank rotor 36 is coaxially coupled with the crankshaft 1a. At the outer periphery of the crank rotor 36, a crank angle sensor 37 composed of an electromagnetic pick-up or others is disposed.

Figure 2:
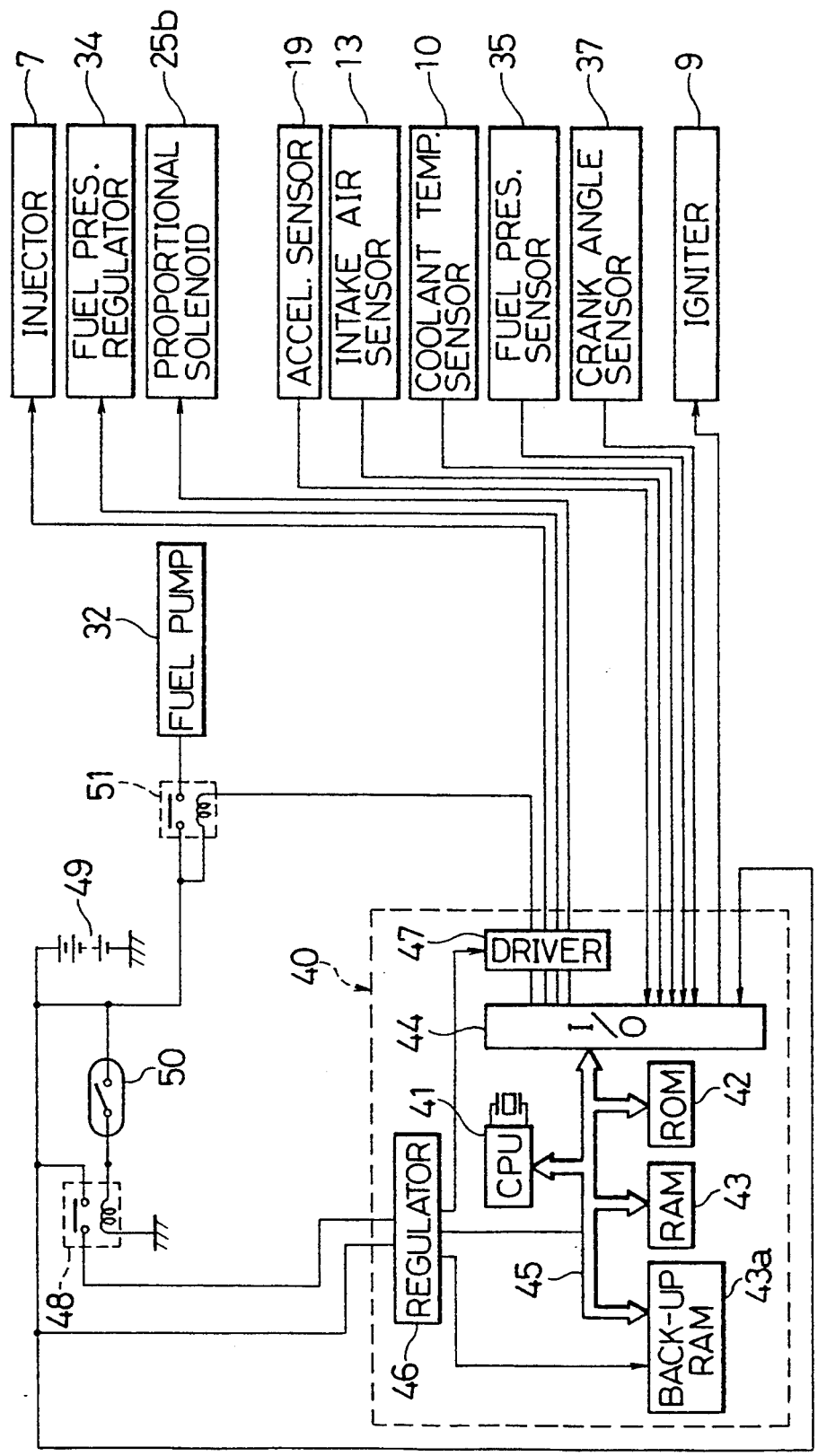
FIG. 2 is a diagrammatic view of the electronic control system.

The sensors and actuators described before are controlled by the ECU 40 as shown in FIG. 2. The ECU 40 is composed of a CPU 41, a ROM 42, RAM 43, a backup RAM 43a, an I/O interface 44, a bus line 45, a regulator 46 for supplying a stable specified electric power source to miscellaneous electronic devices and a driver 47 for driving an injector 7, fuel pressure regulator 34 and a proportional solenoid 25b.

The above regulator 46 is connected with a battery 49 through a relay contact of an ignition relay 48 and at the same time it is connected directly with a battery. When an ignition key switch 50 connecting a relay coil of the ignition relay 48 and the battery 49 is turned on and also a relay contact of the ignition relay 48 is closed, the electrical power is supplied to devices. However, even when the ignition key switch is turned off, the electrical power is continued to be supplied to the backup RAM 43a. Further, the battery 49 is connected with a relay coil of the fuel pump relay 51 and the fuel pump 32 through a relay contact of the fuel pump relay 51.

An input port of the I/O interface 44 is connected with an air flow sensor 13, an accelerator pedal opening sensor 19, a coolant sensor 10, a fuel pressure sensor 35 and a crank angle sensor 37. Also this input port is connected to the battery 49 so as to monitor the battery voltage.

On the other hand, an output port of the above I/O interface 44 is connected to an igniter 9 and further through a driver 47 to a fuel injector 7, a fuel pressure regulator 34, a relay coil of a fuel pump relay 51 and a proportional solenoid 25b of an EGR control valve 25.

The ROM 42 aforementioned stores a control program and miscellaneous fixed control data and the RAM 43 does the data processed based on the signals from the above sensors and switches and further the data processed by the above CPU Electric power is always supplied to the above backup RAM 43a so as to hold such data as trouble codes for self-diagnosis even after an ignition key switch is turned off. In the above CPU 41 the fuel injection amount and the ignition timing are determined according to the control program memorized in the ROM 42 and also when an engine is at a condition needing EGR, a value of electric current output to the solenoid 25b of the EGR control valve 25 is determined. According to the electric current above mentioned an opening area of the EGR control valve 25, namely, an amount of EGR is determined.

Figure 3:
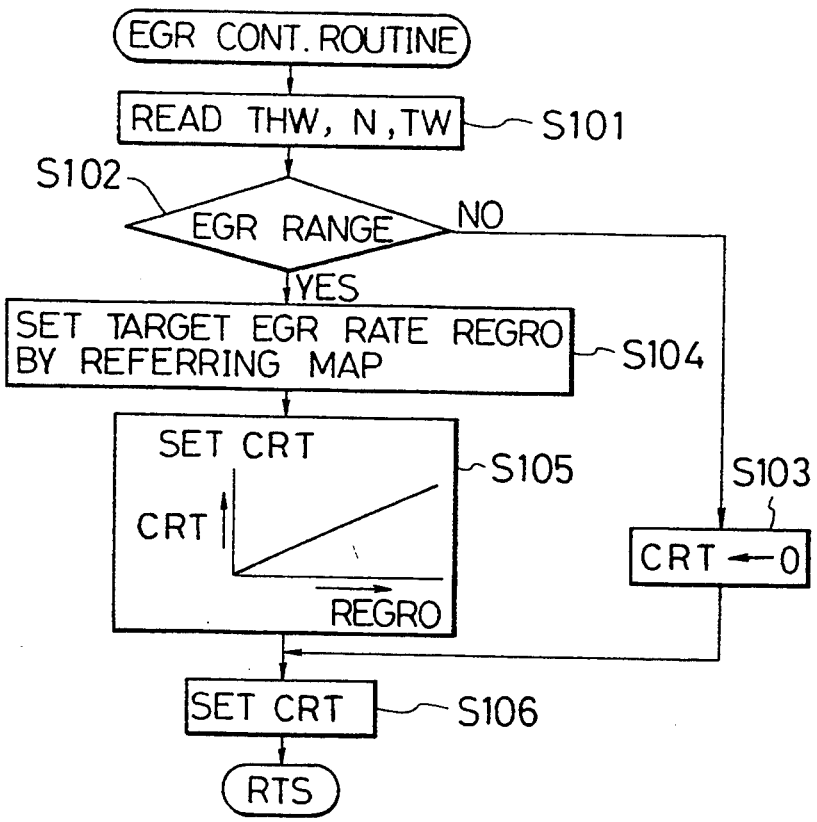
FIG. 3 is a flowchart indicating the EGR control routine.

Next, an operation of the EGR control valve by the above ECU 40 is described according to a flowchart in FIG. 3. FIG. 3 indicates an EGR control routine which is carried out at a specified time interval.

First, at a step S101 an accelerator pedal opening $T_{HV}$ in the accelerator pedal opening sensor 19, an engine speed N based on a signal from the crank angle sensor 37 and a coolant temperature $T_W$ in the coolant temperature sensor 10 are read. Next, the process goes to a step S102 where it is judged whether or not an accelerator pedal opening $T_{HV}$ and a coolant temperature $T_W$ are satisfied with a specified condition respectively to see whether or not an engine is in the condition needing EGR. Further at the step S102, if it is judged that an engine is not in the condition needing EGR, the process is diverted from the step S102 to a step S103 where a value of electric current (hereafter referred to as "CRT") is set to 0 (CRT=0) and the process goes to a step S106. At the step S106, the CRT which has been established at the step S103 is set to the signal to be output to the driver 47 from the I/O port 44 and the routine returns to the main routine. That is to say, in case where an engine is not in the condition needing EGR, the proportional solenoid 25b is rendered off the current, whereby an EGR passage 24 being shut off by the slide valve 25a.

Figure 4:
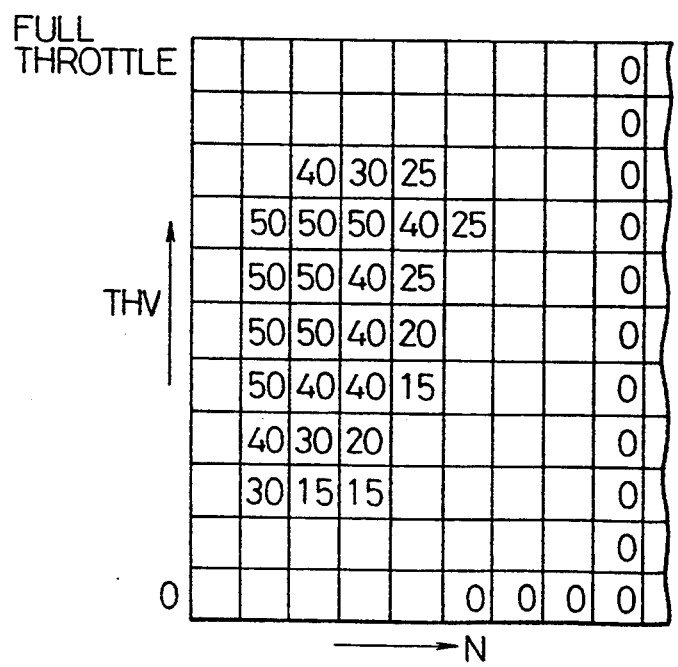
FIG. 4 is a schematic view of the map for determining the opening degree of the recirculation gas control valve.

On the other hand at the step S102, if it is judged that an engine is in the condition needing EGR, the process goes from the step S102 to a step S104 where a target EGR rate $R_{EGRO}$ (%) is determined by referring to a target EGR rate map stored in the ROM 42 with an interporative calculation based on an acceleration pedal opening THV and an engine speed N. In the above-mentioned target EGR rate map, optimum values of the EGR rate obtained experimentally are stored as target values as shown in FIG. 4. In this embodiment an accelerator pedal opening $T_{HV}$ is employed as a parameter indicating an engine load, however it is not necessary to limit to the $T_{HV}$ value. For example, an induction air amount Q may be used alternatively.

At the next step S105, an electric current CRT to be applied to the proportional solenoid 25b is determined based on an EGR rate $R_{EGRO}$ set at the step S104. Since the CRT corresponds to an opening of the slide valve 25a and the opening thereof is proportional to the EGR amount, a relationship between $R_{EGRO}$ and CRT is expressed in a linear function as shown in the step S105. Therefore, the CRT can be obtained either by a reference to a map or a calculation using a formula.

Then, the process goes from the step S105 to a step S106 where the CRT determined above is set so as to be output to the driver 47 from the I/O port 44 and the routine returns to the main routine. When the electric current CRT is applied to the proportional solenoid 25b of the EGR control valve 25, the slide valve 25a is moved to a position corresponding to the electric current CRT against the spring 25c force, thus the EGR valve opening is maintained such that the EGR amount becomes a target EGR rate $R_{EGRO}$.

Because the EGR passage has an enough conduit area to get hold of a sufficient amount of the EGR gas and besides a take-out port of the EGR gas is located upstream of the muffler 23 and downstream of the exhaust pipe 21, it becomes possible to supply a large amount of the cold (high density) recirculation gas to an engine. Also there is another advantage that adverse effects of the back pressure on the gas exchange in a cylinder can be minimized. It is further possible that the NOx emission is reduced more efficiently than a conventional EGR system lowering the cylinder gas temperature before combustion in a four cycle lean burn engine using the present EGR system as well as a two cycle engine as shown in this reference.

The EGR control valve 25 in this embodiment is composed of a slide valve 25a and a solenoid 25b but other constructions using a stepping motor or a similar device instead of a solenoid 25a may be considered.

In summary, the present invention provides an EGR control system characterized in that:
a take-out port of the EGR gas is disposed upstream of the muffler and downstream of the exhaust pipe and an EGR control valve by which the recirculation gas amount is controlled is installed at the junction of the recirculation gas and the induction air, whereby it becomes possible to supply a large quantity of the recirculation gas to an engine. When the EGR system according to the present invention is applied to a two cycle engine or a four cycle lean-burn engine, an excellent effect is obtained in reducing NOx emission or fuel consumption.

While the presently preferred embodiment of the present invention has been shown and described, it is to be understood that this disclosure is for the purpose of illustration and that various changes and modifications may be made without departing from the scope of the invention as set forth in the appended claims.

I claim:

1. An exhaust gas recirculation (EGR) system for an internal combustion engine, having an EGR control valve for reducing the NOx emission in the engine by recirculating a portion of exhaust gases into an induction air conduit through an EGR passageway, the system comprising:
    a take-out port of exhaust gases located at a portion of an exhaust pipe downstream of a catalytic converter and upstream of a muffler;
    a control valve provided on said induction air conduit for controlling an amount of air flowing through said control valve;
    a confluence portion of said induction air conduit and said EGR passageway located between an air cleaner and said control valve; and
    an electrically operative EGR control valve disposed at said confluence portion so as to control the amount of the recirculated exhaust gas in accordance with an opening area of said EGR control valve.

2. The system according to claim 1, wherein said opening area of said EGR control valve is controlled by an electric current generated from an engine control unit (ECU) based on engine operating conditions.

3. The system according to claim 1, wherein a slide valve for varying said opening area of said EGR control valve and a proportional solenoid for actuating said slide valve are incorporated in said EGR control valve.

4. The system according to claim 1, wherein said internal combustion engine is a two cycle engine.

5. The system according to claim 1, wherein said internal combustion engine is a four cycle engine.

6. The system according to claim 2, wherein
said electric current is provided by referring to a map parameterizing an engine speed, a coolant temperature and a throttle opening.

7. A method for connecting an exhaust pipe and an induction air conduit through an EGR passageway, the method comprising the steps of:
    disposing a take-out port of exhaust gases at a portion of said exhaust pipe downstream of a catalytic converter and upstream of a muffler; and
    disposing an introduction port of exhaust gases into said induction air conduit at a portion of said induction air conduit downstream of a air cleaner and upstream of a valve which controls an amount of induction air into the engine.

8. The system according to claim 1, further comprising:
    an air flow sensor provided on said induction air conduit upstream of said confluence portion.

9. The system according to claim 1, further comprising:
    a check valve provided on said induction air conduit and between said air cleaner and said confluence portion for preventing an air flowing back to said air cleaner.

10. The system according to claim 4, wherein said control valve is a by-pass control valve.

11. The system according to claim 5, wherein said control valve is a throttle valve.

12. An exhaust gas recirculation system for an internal combustion engine having, an intake pipe for inducing air into a cylinder of said engine, an air flow sensor mounted on an inside wall of said intake pipe at a most forefront position thereof, a throttle valve provided in said intake pipe for controlling an intake air amount to said cylinder, an accelerator sensor attached to an accelerator pedal for measuring a depressed amount of said accelerator pedal and for producing an accelerator signal, a fuel system for supplying fuel into said cylinder via a fuel injector inserted into a cylinder head, an exhaust pipe connected to said cylinder for discharging exhaust gas, a muffler connected to an end portion of said exhaust pipe, a catalytic converter inserted between said cylinder and said muffler in said exhaust pipe for purifying said exhaust gas, an engine speed sensor attached near a crankshaft of said engine for detecting an engine speed and for generating an engine speed signal, and a temperature sensor inserted in said wall for sensing a coolant temperature in a water jacket and for producing a temperature signal, the system which comprises:
    a check valve provided in said intake pipe at a position just downstream of said air flow sensor for preventing backflow of intake air;
    an inlet port of an emission gas recirculation passage connected to a position just upstream of said muffler in said exhaust pipe for producing a cooled exhaust gas after passage through said exhaust pipe;
    an outlet port of said emission gas recirculation passage connected to a position just downstream of said check valve in said intake pipe;

said outlet port having the same cross sectional area as that of said intake pipe for returning a huge amount of said exhaust gas to said engine;

control means responsive to said accelerator signal, said engine speed signal and said temperature signal for deciding to control said huge amount at an optimum value by referring to a data map stored as a function of engine operating conditions so as to effectively recirculate said huge amount of said cooled exhaust gas for a lean burning engine.

* * * * *